United States Patent
Yan et al.

(10) Patent No.: US 11,975,623 B2
(45) Date of Patent: May 7, 2024

(54) METHOD FOR CONTROLLING CHARGING CURRENT OF ELECTRIC VEHICLE AND CHARGING DEVICE

(71) Applicant: Delta Electronics (Shanghai) Co., Ltd., Shanghai (CN)

(72) Inventors: Chao Yan, Shanghai (CN); Peng Xue, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 451 days.

(21) Appl. No.: 17/125,980

(22) Filed: Dec. 17, 2020

(65) Prior Publication Data

US 2021/0339640 A1    Nov. 4, 2021

(30) Foreign Application Priority Data

Apr. 29, 2020  (CN) .......................... 202010359053.8

(51) Int. Cl.
| | | |
|---|---|---|
| *H02J 7/00* | (2006.01) | |
| *B60L 53/16* | (2019.01) | |
| *B60L 53/302* | (2019.01) | |
| *B60L 53/60* | (2019.01) | |
| *H02J 7/14* | (2006.01) | |

(52) U.S. Cl.
CPC ............. *B60L 53/302* (2019.02); *B60L 53/16* (2019.02); *B60L 53/60* (2019.02); *H02J 7/007192* (2020.01)

(58) Field of Classification Search
CPC ........ B60L 53/302; B60L 53/60; B60L 53/16; H02J 7/007192

USPC ......................................................... 320/104
See application file for complete search history.

(56) References Cited

U.S. PATENT DOCUMENTS

| | | | | |
|---|---|---|---|---|
| 6,188,202 | B1 * | 2/2001 | Yagi .................. | H02J 7/007184 320/125 |
| 2011/0316486 | A1 * | 12/2011 | Inaba ..................... | H01M 10/48 320/150 |
| 2012/0025773 | A1 * | 2/2012 | Wang .................. | H02J 7/00714 320/129 |
| 2013/0029193 | A1 * | 1/2013 | Dyer ....................... | B60L 53/14 180/65.21 |
| 2013/0201641 | A1 * | 8/2013 | Soden ..................... | B60L 58/25 361/752 |
| 2014/0021914 | A1 * | 1/2014 | Martin .................... | B60L 53/38 320/109 |

(Continued)

FOREIGN PATENT DOCUMENTS

| | | |
|---|---|---|
| CN | 204497757 U | 7/2015 |
| CN | 106898832 A | 6/2017 |

(Continued)

*Primary Examiner* — Alexis B Pacheco
(74) *Attorney, Agent, or Firm* — CKC & Partners Co., LLC

(57) ABSTRACT

The disclosure provides a method for controlling a charging current of an electric vehicle and a charging device. The controlling method includes: sampling current temperature of the charging connection node; generating a current regulation amount according to the current temperature and a preset target temperature threshold; and regulating the charging current flowing through the charging connection node according to the current regulation amount.

23 Claims, 9 Drawing Sheets

(56) References Cited

U.S. PATENT DOCUMENTS

| | | | | |
|---|---|---|---|---|
| 2014/0210415 A1* | 7/2014 | Ohmori | ............... | H01M 10/44 |
| | | | | 320/118 |
| 2019/0375309 A1* | 12/2019 | Fuhrer | ............... | B60L 53/62 |
| 2020/0076224 A1* | 3/2020 | Tsukamoto | ......... | H01M 10/613 |
| 2020/0343675 A1* | 10/2020 | Wolf | ............... | B60L 53/302 |

FOREIGN PATENT DOCUMENTS

| | | | |
|---|---|---|---|
| CN | 107171412 | A | 9/2017 |
| CN | 107785958 | A | 3/2018 |
| CN | 107933340 | A | 4/2018 |
| CN | 111016707 | A | 4/2020 |
| DE | 102018200886 | B3 | 7/2019 |
| IN | 207631001 | U | 7/2018 |
| WO | 2011127446 | A2 | 10/2011 |
| WO | 2014036013 | A2 | 3/2014 |
| WO | 2018069542 | A1 | 4/2018 |

* cited by examiner

METHOD FOR CONTROLLING CHARGING CURRENT OF ELECTRIC VEHICLE AND CHARGING DEVICE

CROSS-REFERENCE TO RELATED APPLICATIONS

This non-provisional application claims priority under 35 U.S.C. § 119(a) on Patent Application No. 202010359053.8 filed in P.R. China on Apr. 29, 2020, the entire contents of which are hereby incorporated by reference.

Some references, if any, which may include patents, patent applications and various publications, may be cited and discussed in the description of this disclosure. The citation and/or discussion of such references, if any, is provided merely to clarify the description of the present disclosure and is not an admission that any such reference is "prior art" to the disclosure described herein. All references listed, cited and/or discussed in this specification are incorporated herein by reference in their entireties and to the same extent as if each reference was individually incorporated by reference.

FIELD

The disclosure relates to a method and device for charging an electric vehicle, and particularly to a method for controlling a charging current of an electric vehicle and a charging device.

BACKGROUND

A charger is a device for charging electric vehicles. The charger is connected to vehicle batteries for electric energy transmission through a charging connector. A charging connection node is a contact node between an output end of the charging connector and an input end of the electric vehicle, or a contact node between an output end of a power supply and an input end of the charging connector.

Abnormal heating at the contact node of the connector may be caused by the following factors:
(1) oxidization of copper pillars at the contact node of the connector after long use of the connector;
(2) abrasion of copper pillars at the contact node of the connector caused by plug and unplug in long term use of the connector;
(3) loose contact between the connector and the output end of the power supply, or between the connector and the input end of the electric vehicle.

The above factors lead to an increasing resistance at the contact node of the charging connector, so that high temperature is easily generated in charging process and thus causing safety risks such as ablation, so temperature protection is necessary at the contact node of the charging connector. In the current temperature protection method, if the temperature exceeds a protection threshold, the charger cuts off the charging current, and stops charging. The problem lies in that the chargers cannot satisfy the requirement for continuously charging the vehicles. After charging is initiated, if the user leaves the charging site for a long time, in the case that temperature at the contact node of the connector is too high, it is impossible to satisfy the user's expectation for full charge.

SUMMARY

To solve the above problem and deficiency, the application provides a method for controlling a charging current of an electric vehicle and a charging device. The controlling method can control temperature of the charger connection node to a target temperature point below an over-temperature shutdown protection threshold of the charger, and in the case that temperature at the connection node of the charging connector is high, the charger can be maintained at a high power to continuously charge the vehicles.

The method for controlling a charging current of an electric vehicle in the application is adapted to control temperature of a charging connection node where a charging connector of a charging device is connected to a power supply or the electric vehicle, the method including:

step S1, sampling current temperature $T_c$ of the charging connection node;

step S2, generating a current regulation amount $\Delta I$ according to the current temperature $T_c$ and a preset target temperature threshold $T_{ref}$; and step S3, regulating the charging current flowing through the charging connection node according to the current regulation amount $\Delta I$, such that the temperature of the charging connection node is maintained to be close to the target temperature threshold $T_{ref}$.

The disclosure further provides a charging device of an electric vehicle, including: a charging connector connected to a power supply or the electric vehicle, and further including:

a power converting unit for receiving power supplied by the power supply, and supplying a charging current to the electric vehicle;

a temperature detecting unit coupled to the charging connector for sampling current temperature of a charging connection node where the charging connector is connected to the power supply or the electric vehicle; and a charging control unit coupled to the charging connector and the temperature detecting unit for receiving current temperature $T_c$ from the temperature detecting unit, and generating a current regulation amount $\Delta I$ according to a preset target temperature threshold $T_{ref}$ and the current temperature $T_c$, the power converting unit regulating the charging current flowing through the charging connection node according to the current regulation amount $\Delta I$, such that the temperature of the charging connection node remains near the target temperature threshold $T_{ref}$. In conclusion, during charging, when a temperature of the charging connection node exceeds the target temperature threshold $T_{ref}$, the temperature of the charging connector can be stably regulated to be close to the given target temperature threshold by the controlling method. Meanwhile, if the actual measured temperature exceeds an over-temperature threshold, the charger stops outputting.

Hereinafter the specification will be described in detail with reference to the embodiments, and further explanations are provided to the technical solution of the disclosures.

BRIEF DESCRIPTION OF THE DRAWINGS

To enable the above and other objects, features, advantages and embodiments of the disclosures to become more apparent, the accompanying drawings are explained as follows.

DETAILED DESCRIPTION

Figure 1:
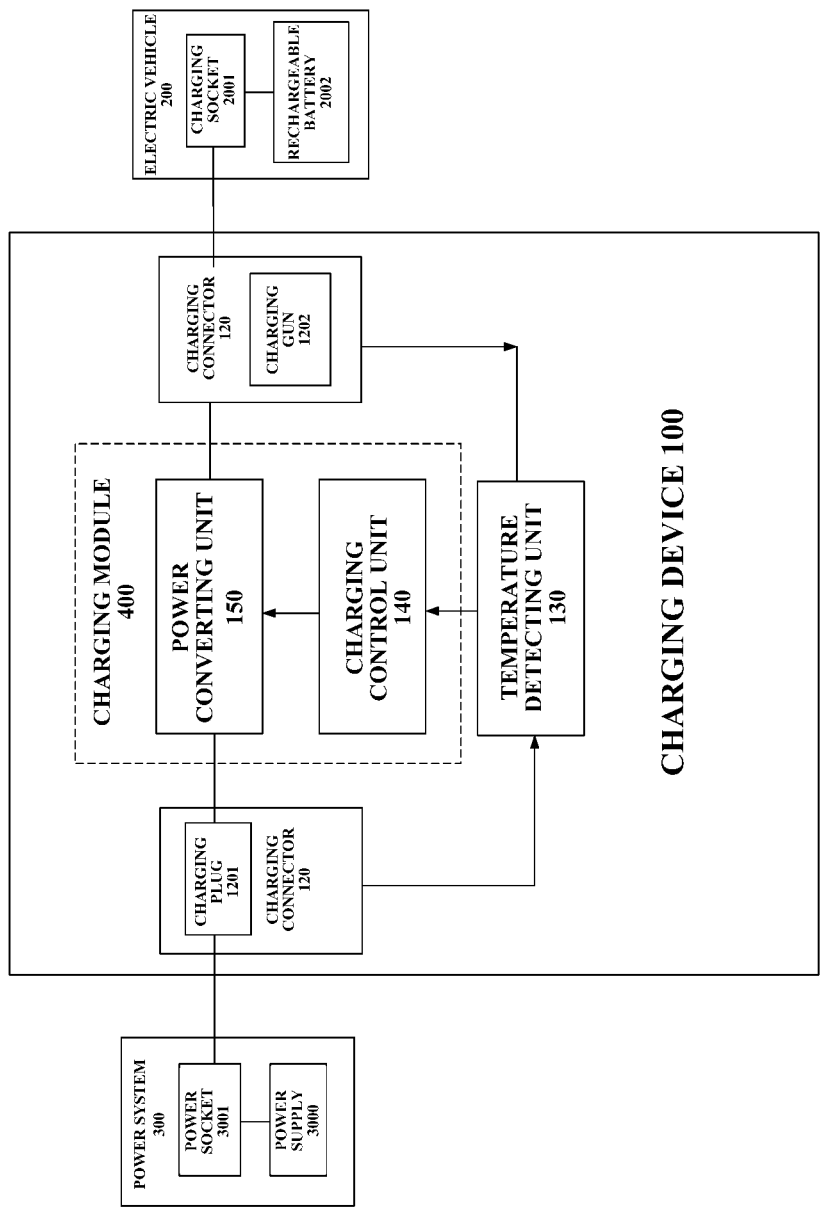
FIG. 1 is a diagram illustrating connections between a charging device and a power system, and between the charging device and an electric vehicle in the first embodiment of the disclosure.

FIG. 1 is a diagram illustrating connections between a charging device and a power system, and between the charging device and an electric vehicle in the first embodiment of the disclosure. The charging device 100 includes a power converting unit 150, a charging control unit 140, a temperature detecting unit 130 and a charging connector 120. The charging connector 120 includes a charging plug 1201 and a charging gun 1202. The power system 300 includes a power supply 3000 and a power socket 3001. The charging plug 1201 of the charging connector 120 is electrically connected to the power socket 3001 of the power supply 3000 for supplying power to the power converting unit 150. One end of the temperature detecting unit 130 is coupled to the charging connector 120, and the other end of the temperature detecting unit 130 is coupled to the charging control unit 140 of the charging device 100. One end of the charging gun 1202 or the charging plug 1201 is electrically connected to the power converting unit 150, and the other end of the charging gun 1202 or the charging plug 1201 is electrically connected to a charging socket 2001 of the electric vehicle 200 for supplying a charging current to the electric vehicle 200. The charging socket 2001 is electrically connected to a rechargeable battery 2002 of the electric vehicle 200. The power supply 3000 may be an AC power supply, and also may be a DC power supply. A charging module 400 includes the power converting unit 150 and the charging control unit 140. In other embodiments, charging gun 1202 is eliminated, and a charging plug of the charging module 400 is directly connected to the electric vehicle. In this embodiment, the charging device is applied to an AC environment, and the charging device is coupled to the AC power supply to output a charging current to the electric vehicle 200.

In this embodiment, the charging control unit 140 controls a charging current output to the electric vehicle 200 from the power converting unit 150. A charging connection node is a connection node between the charging plug 1201 of the charging connector 120 and the power socket 3001 of the power system 300, or a connection node between the charging gun 1202 of the charging connector 120 and the electric vehicle 200. The temperature detecting unit 130 is mounted adjacent to the charging connection node for detecting temperature of the charging connection node. The temperature detecting unit 130 transmits the detected current temperature of the charging connection node to the charging control unit 140.

In the application, by regulating temperature of the charging connection node close to a target temperature value below an over-temperature shutdown protection threshold of the charging device 100, the charger can be maintained at a high power to continuously charge the vehicles in the case that the temperature of the charging connection node is high.

In this embodiment, the charging device 100 includes a charging connector 120 connected to a power supply 3000 or an electric vehicle 200; a temperature detecting unit 130 coupled to the charging connector 120 for sampling current temperature of a charging connection node where the charging connector 120 is connected to the power supply 3000 or the electric vehicle 200; a charging control unit 140 coupled to the temperature detecting unit 130 for receiving current temperature $T_c$ from a temperature sensor, and generating a current regulation amount $\Delta I$ according to a preset target temperature threshold $T_{ref}$ and the current temperature $T_c$; and a power converting unit 150 for receiving power supplied by the power supply 3000, supplying a charging current to the electric vehicle 200, and regulating the charging current flowing through the charging connection node according to the current regulation amount $\Delta I$, such that the temperature of the charging connection node maintains to be close to the target temperature threshold $T_{ref}$. Close to the target temperature threshold $T_{ref}$ refers to a temperature fluctuating within +/−3° C. from the target temperature threshold $T_{ref}$.

Figure 2:
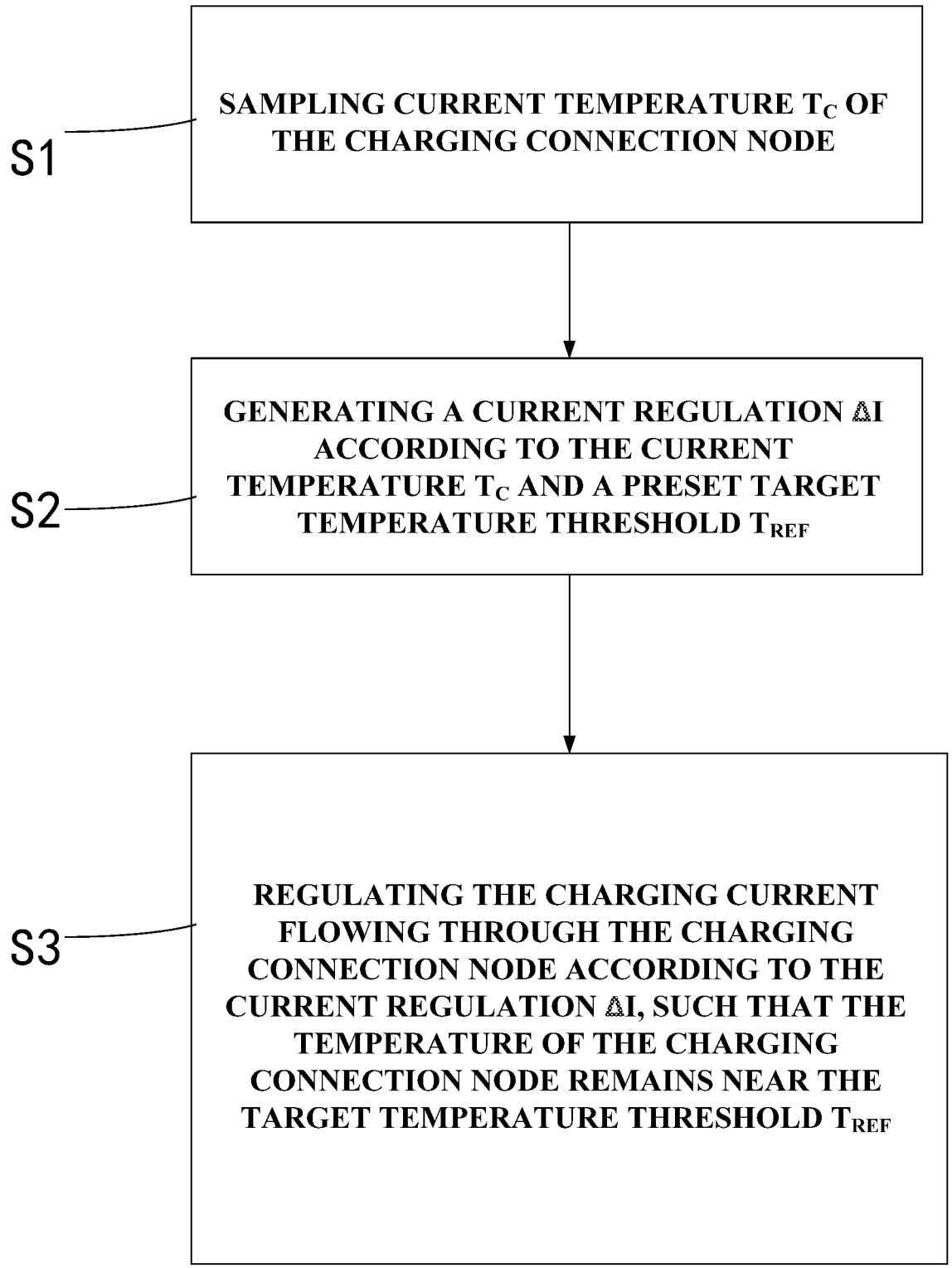
FIG. 2 is a flow diagram of a method for controlling charging of the electric vehicle in the first embodiment of the disclosure.
Figure 3:
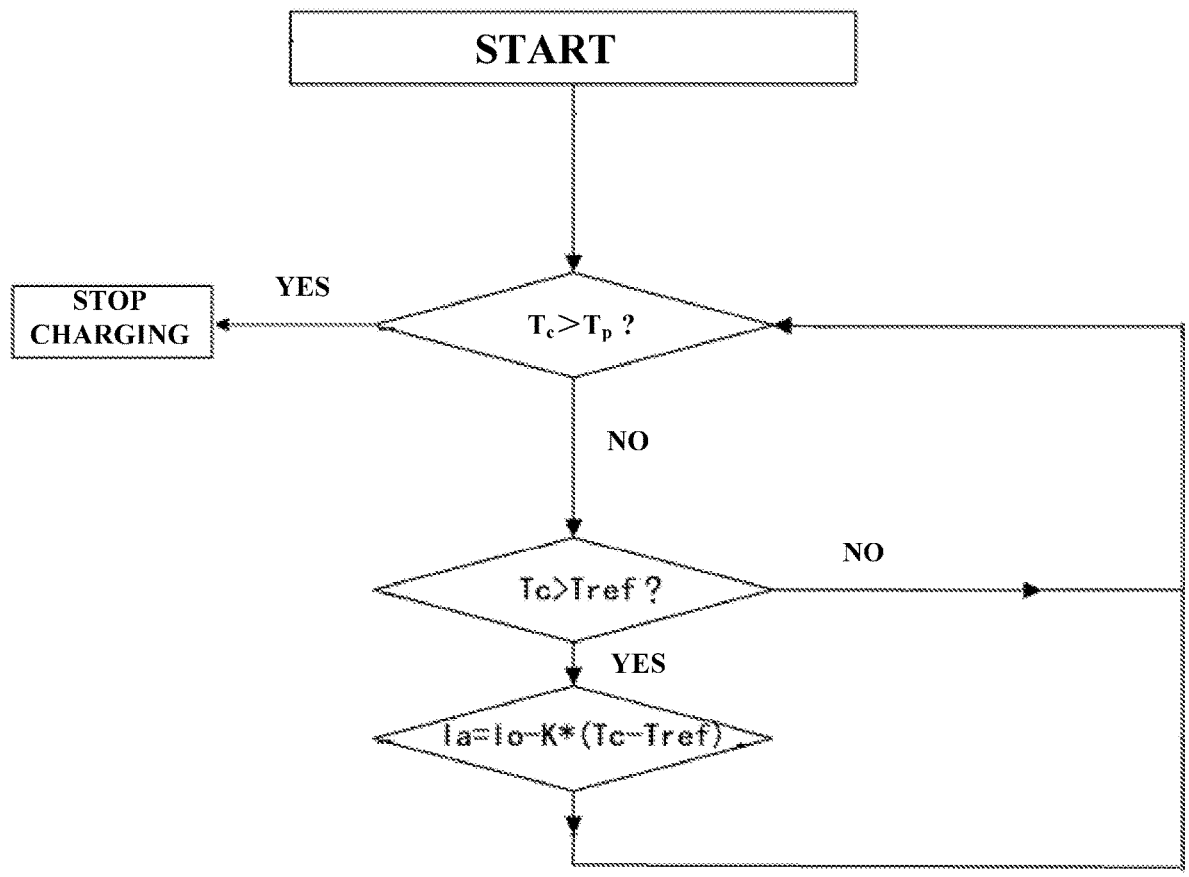
FIG. 3 is a diagram illustrating controlling logic of a charging current of the electric vehicle in the first embodiment of the disclosure.

The method for controlling a charging current of an electric vehicle proposed in this application is adapted to control temperature of a charging connection node where a charging connector 120 of a charging device 100 is connected to a power supply 3000 or the electric vehicle. Referring to FIGS. 2 and 3 simultaneously, FIG. 2 is a flow diagram of a method for controlling a charging current of the electric vehicle in the first embodiment of the disclosure, and FIG. 3 is a diagram illustrating a controlling logic of the charging current of the electric vehicle in the first embodiment of the disclosure. The method for controlling a charging current of the electric vehicle includes: step S1, sampling current temperature $T_c$ of the charging connection node; step S2, generating a current regulation amount $\Delta I$ according to the current temperature $T_c$ and a preset target temperature threshold $T_{ref}$; and step S3, regulating the charging current flowing through the charging connection node according to the current regulation amount $\Delta I$, such that the temperature of the charging connection node is maintained to be close to the target temperature threshold $T_{ref}$.

As can be known from FIG. 3, the step S2 further includes that the charging control unit 140 controls the power converting unit 150 to stop charging the electric vehicle if the current temperature $T_c$ of the charging connection node sampled by the temperature detecting unit 130 is higher than an over-temperature threshold $T_p$, i.e., $T_c > T_p$. The step S2 further includes that the current regulation amount $\Delta I$ is generated according to a temperature difference between the target temperature threshold $T_{ref}$ and the current temperature $T_c$ when the current temperature $T_c$ of the charging connection node is between the target temperature threshold and an over-temperature threshold $T_p$, i.e., $T_{ref} < T_c < T_p$. The step S2 further includes that the charging device 100 maintains the current charging current when the current temperature $T_c$ of the charging connection node is lower than the target temperature threshold $T_{ref}$, i.e., $T_c < T_{ref}$.

Functional relationship of the current regulation amount $\Delta I$ satisfies following Equation (1):

$$\Delta I = I_o - I_a = K^*(T_c - T_{ref}) \tag{1}$$

In the Equation (1), Ia is the charging current corresponding to the current temperature, Io is the maximum charging current, and K is a regulation coefficient. When Tc<Tp and Tc>Tref, the charging control unit regulates the charging current according to the above Equation (1).

In the second embodiment of the disclosure, the method for controlling the charging current and the charging device are substantially the same as that in the first embodiment, and the differences lie in that the charging connector 120 of the charging device is provided with a cooling device, and the method for controlling the charging current further includes a step S4 between the step S1 and the step S2, where the charging connection node is cooled in step S4. If the current temperature $T_c$ of the charging connection node still exceeds the target temperature threshold $T_{ref}$ when cooling effect reaches maximum, the charging current of the electric vehicle is decreased through the charging control unit, thereby reducing the temperature of the charging connection node.

In the step S4, the charging connection node may be cooled by liquid cooling or air cooling manner. When utilizing liquid cooling manner, the temperature of the connection node is controlled by regulating a refrigerating control amount. If the temperature $T_c$ of the charging connection node still exceeds the target temperature threshold $T_{ref}$, the refrigerating control amount is regulated to maximum. When utilizing air cooling manner, the temperature of the connection node is controlled by regulating a fan speed. If the temperature $T_c$ of the charging connection node still exceeds the target temperature threshold $T_{ref}$, the fan speed is regulated to maximum.

In the third embodiment of the disclosure, the method for controlling the charging current and the charging device are substantially the same as that in the first embodiment, and the differences lie in that the charging connector 120 of the charging device is provided with a cooling device, and the method for controlling the charging current further includes a step S5 before the step S1, where the charging connection node is cooled in step S5. Similarly with the second embodiment, the charging connection node is firstly cooled, if the current temperature $T_c$ of the charging connection node still exceeds the target temperature threshold $T_{ref}$ when cooling effect reaches maximum, the charging current of the electric vehicle 200 is decreased through the charging control unit 140, thereby reducing the temperature of the charging connection node. In the step S5, the charging connection node may be cooled by liquid cooling or air cooling manner. When utilizing liquid cooling manner, the temperature of the connection node is controlled by regulating a refrigerating control amount. If the current temperature $T_c$ of the charging connection node still exceeds the target temperature threshold $T_{ref}$, the refrigerating control amount is regulated to maximum. When utilizing air cooling manner, the temperature of the connection node is controlled by regulating a fan speed. If the temperature $T_c$ of the charging connection node still exceeds the target temperature threshold $T_{ref}$, the fan speed is regulated to maximum.

Figure 4:
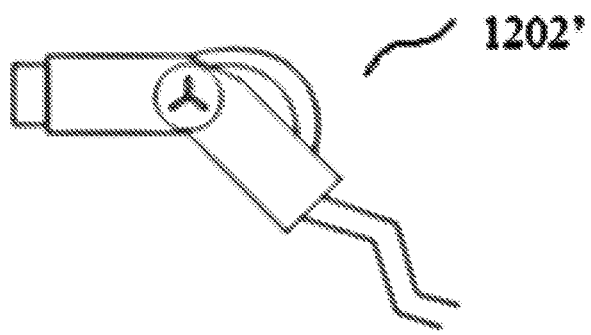
FIG. 4 is a structural diagram of an air cooling charging gun.
Figure 5:
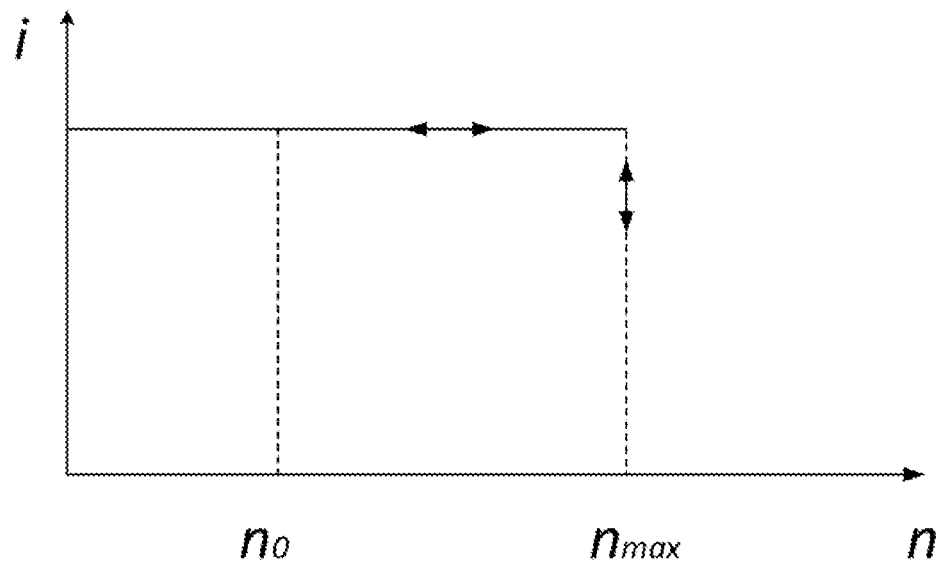
FIG. 5 is a diagram illustrating a relationship between a fan speed and the charging current of the air cooling charging gun.

Referring to FIGS. 4 and 5, FIG. 4 is a structural diagram of an air cooling charging gun, and FIG. 5 is a diagram illustrating a relationship between a fan speed and the charging current of the air cooling charging gun. As shown in FIG. 5, a vertical coordinate i is the current charging current, and a horizontal coordinate n (within a range from $n_0$ to $n_{max}$) is the fan speed control quantity of the air cooling charging gun 1202'. When the air cooling device reaches the maximum air cooling amount, the charging control unit regulates the charging current.

Figure 6:
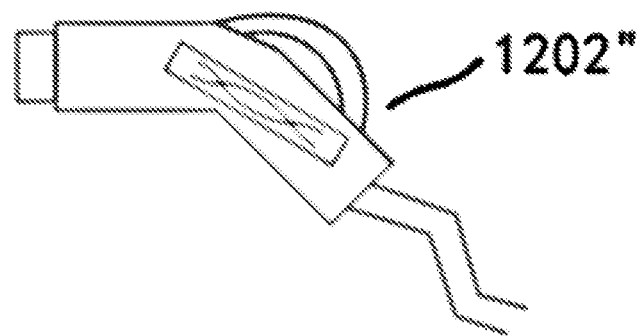
FIG. 6 is a structural diagram of a liquid cooling charging gun.
Figure 7:
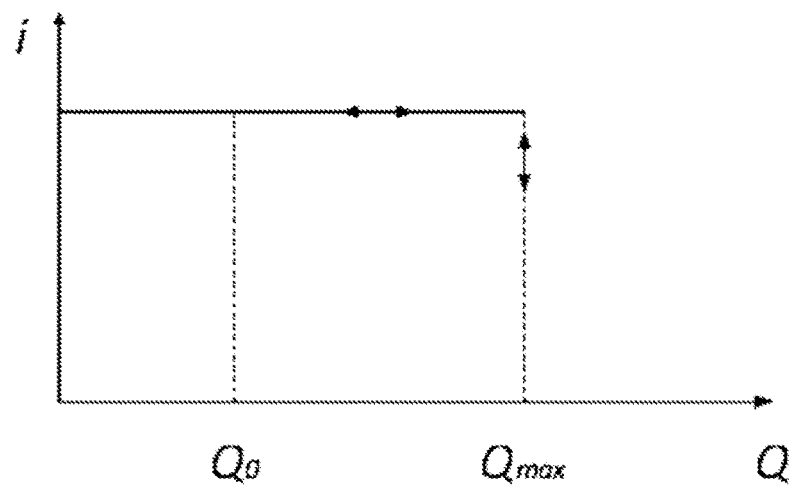
FIG. 7 is a diagram illustrating a relationship between a refrigerating control amount and the charging current.
Figure 8:
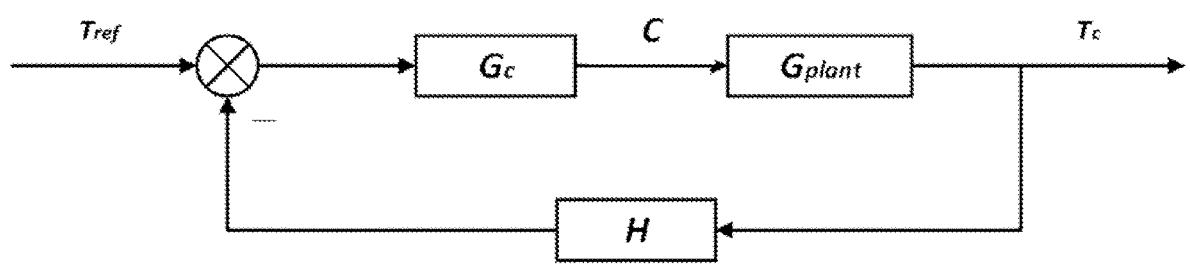
FIG. 8 is a mathematical model of a charging control unit.

Referring to FIGS. 6 and 7, FIG. 6 is a structural diagram of a liquid cooling charging gun, and FIG. 7 is a diagram illustrating a relationship between a refrigerating control amount and the charging current. As shown in FIG. 8, the vertical coordinate i is the current charging current, and the horizontal coordinate Q (within a range from $Q_0$ to $Q_{max}$) is the refrigerating control amount of the liquid cooling charging gun 1202''. When the maximum refrigerating amount is reached, the charging current is regulated.

Referring to FIG. 8, FIG. 8 is a mathematical model of the charging control unit. As can be known from the mathematical model, an output current (I) is associated with the air cooling fan speed (n), the liquid cooling refrigerating control amount (Q), the current temperature and the target temperature threshold, wherein $T_{ref}$ is the target temperature threshold, $T_c$ is the current temperature, $G_c$ is a gun cable temperature controller, $G_{plant}$ is a gun cable integrated device, H is a proportional coefficient of the temperature, and C is the current/refrigerating amount.

Figure 9:
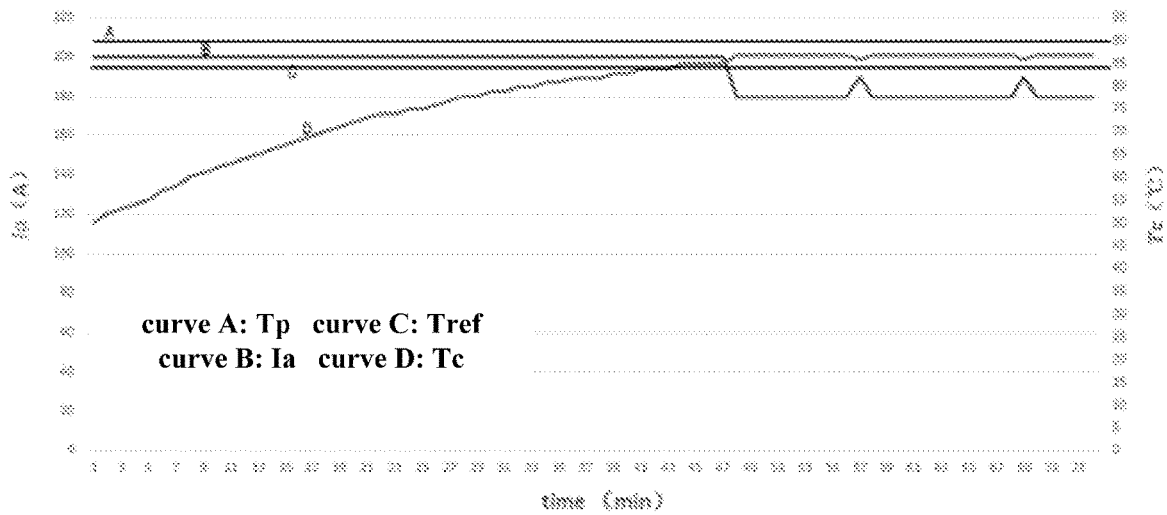
FIG. 9 is an effect diagram of the method for controlling a charging current of an electric vehicle in one embodiment of the disclosure.
Figure 10:
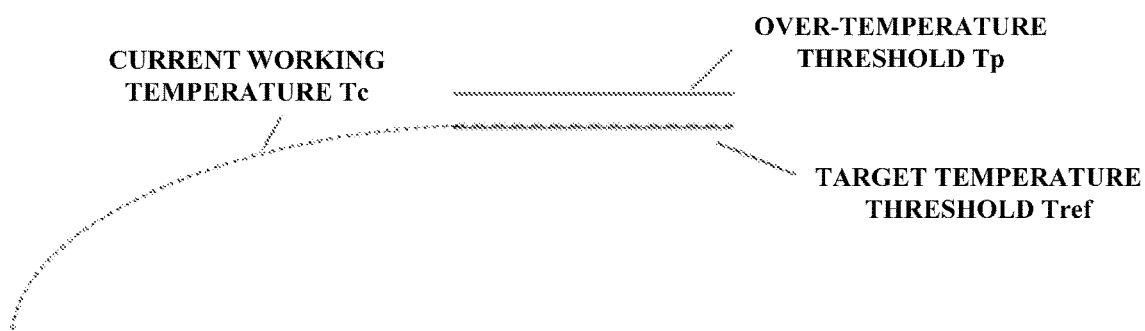
FIG. 10 is a model of a temperature protection threshold in one embodiment.

FIG. 9 is an effect diagram of the method for controlling a charging current of an electric vehicle in one embodiment of the disclosure, and FIG. 10 is a model of a temperature protection threshold in one embodiment. FIG. 9 is a double coordinate system, the left vertical coordinate is the charging current $I_a$, the right vertical coordinate is the current temperature $T_c$ of the charging connection node sampled by the temperature detecting unit 130, and the horizontal coordinate is time. As can be known from FIG. 9, $T_{ref}$ is set to be 85°, and $T_p$ is set to be 90°. The current temperature $T_c$ rises as time passes within about 45 minutes from the beginning, and the charging current is maintained at 200A. At about 45 minute, the current temperature $T_c$ of the charging connection node starts to exceed the temperature threshold $T_{ref}$, and the charging control unit 140 generates a current regulation amount $\Delta I$ according to a difference between the current temperature $T_c$ and the target temperature threshold $T_{ref}$, and decreases the current charging current to 180 A. At this time, the charging device continuously charges the electric vehicle 200 with the current charging current 180 A for a long time, and the temperature of the charging connection node is stabilized between 85° and 87.5°. Considering of a tolerance of the sensor, a temperature of Tref±3° C. can be considered as that the temperature is controlled to the target temperature point. As can be seen from FIG. 10, under regulation of the charging control unit 140, the temperature of the charging connection node is maintained to be close to a target temperature threshold $T_{ref}$ below the over-temperature threshold $T_p$, and close to the $T_{ref}$ refers to a temperature of Tref±3° C. The charger can be maintained at a high power to continuously power the vehicles.

The charging device in the first, second and third embodiments can be an AC charger, and also can be a DC charger.

Figure 11:
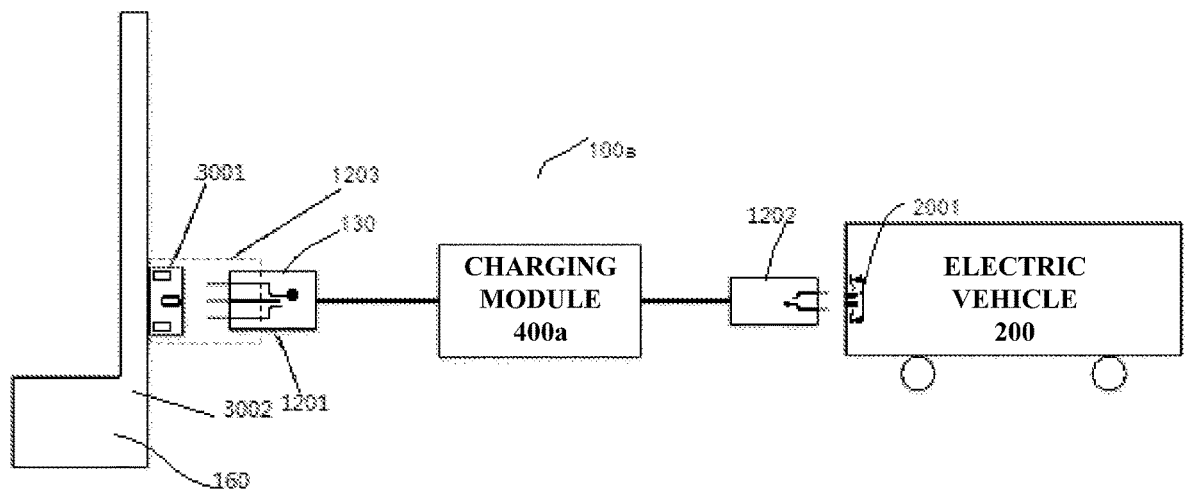
FIG. 11 is a diagram illustrating connections between a portable AC charger, a power supply and the electric vehicle.

Referring to FIG. 11, FIG. 11 is a diagram illustrating connections between a portable AC charger and the power supply, and between the portable AC charger and the electric vehicle. A portable AC charger 100a is used as the charging device. The charging module of the portable AC charger is 400a. The power supply 3000 for the portable AC charger is provided inside a wall 160. The portable AC charger 100a outputs an AC current. The internal structure of the portable AC charger 100a, and connections between the portable AC charger 100a and the power supply 3000, and between the portable AC charger 100a and the electric vehicle are the same as that in the first embodiment, and the detailed are not described here. Connection 1203 between the charging plug 1201 of the charging connector 120 and the power socket 3001 of the power supply 3000 is the charging connection node.

Figure 12:
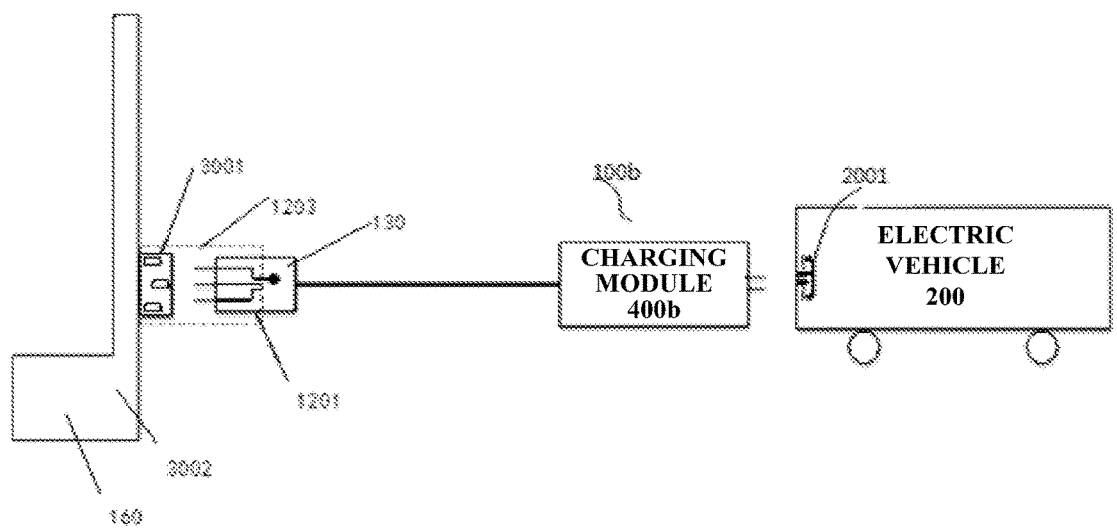
FIG. 12 is a diagram illustrating connections between an integrated AC charger and the power supply, and between the integrated AC charger and the electric vehicle.

Referring to FIG. 12, FIG. 12 is a diagram illustrating connections between an integrated AC charger and the power supply and between the integrated AC charger and the electric vehicle. An integrated AC charger 100b is used as the charging device. The charging module of the integrated AC charger is 400b. The power supply 3000 for the integrated AC charger 100b is provided inside the wall 160. The integrated AC charger 100b outputs an AC current. The internal structure of the integrated AC charger 100b and connection between the integrated AC charger 100b and the power supply 3000 are the same as that in FIG. 11. The differences from FIG. 11 lie in that the integrated charger does not have the charging gun 1202, and a plug of the charging module 400b is connected to the electric vehicle 200. Connection 1203 between the charging plug 1201 and the power socket 3001 of the power supply 3000 is the charging connection node.

Figure 13:
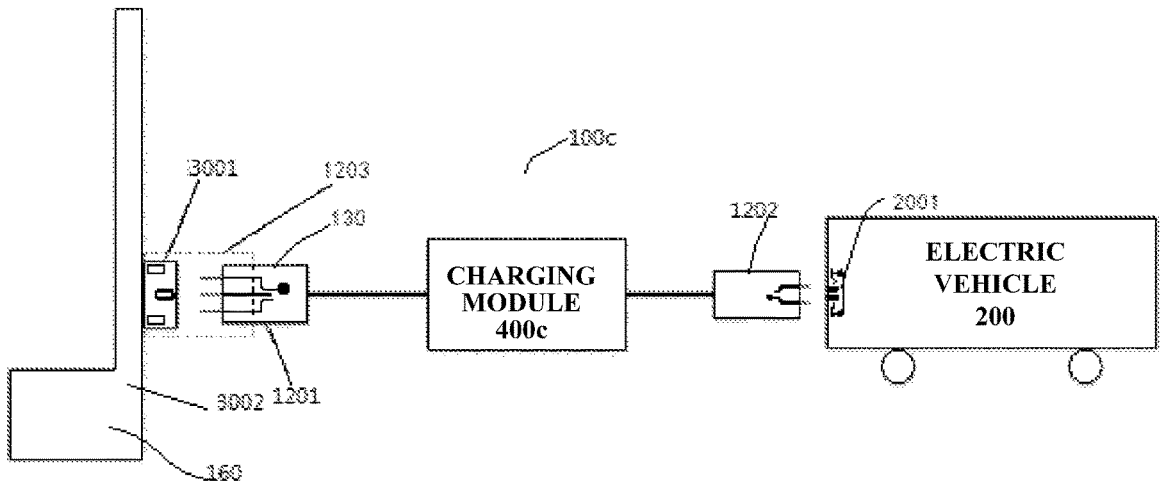
FIG. 13 is a diagram illustrating connections between a portable DC charger and the power supply, and between the portable DC charger and the electric vehicle.

Referring to FIG. 13, FIG. 13 is a diagram illustrating connections between a portable DC charger and the power supply and between the portable DC charger and the electric vehicle. A portable DC charger 100c is used as the charging device. The charging module of the portable DC charger is 400c. The power supply 3000 for the portable DC charger 100c is provided inside the wall 160. The portable DC charger 100c outputs a DC current. The internal structure of the portable DC charger 100c and connections between the portable DC charger 100c and the power supply 3000, and between the portable DC charger 100c and the electric vehicle 200 are the same as that in FIG. 11, and the details are not described here. Connection 1203 between the charging plug 1201 of the charging connector 120 and the power socket 3001 of the power supply 3000 is the charging connection node.

Figure 14:
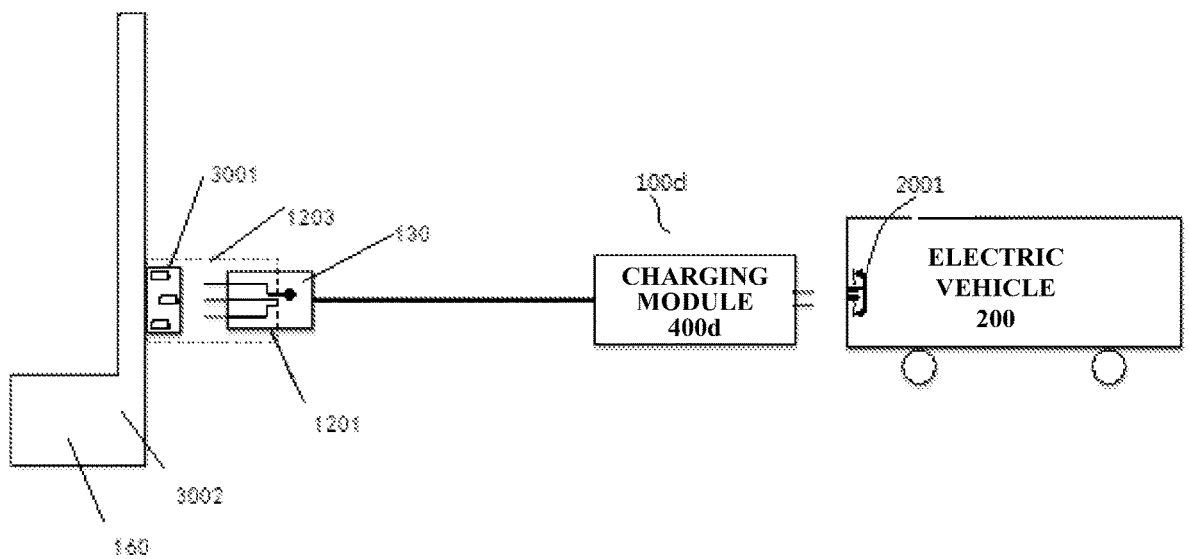
FIG. 14 is a diagram illustrating connections between an integrated DC charger and the power supply, and between the integrated DC charger and the electric vehicle.

Referring to FIG. 14, FIG. 14 is a diagram illustrating connections between an integrated DC charger and the power supply and between the integrated DC charger and the electric vehicle. An integrated DC charger 100d is used as the charging device. The charging module of the integrated DC charger is 400d. The power supply 3000 for the integrated DC charger 100d is provided inside the wall 160. The integrated DC charger 100d outputs a DC current. The internal structure of the integrated DC charger 100d and connections between the integrated DC charger 100d and the power supply 3000 and between the integrated DC charger 100d and the electric vehicle 200 are the same as that in FIG. 12, and the details are not described here. Connection 1203 between the charging plug 1201 of the charging connector 120 and the power socket 3001 of the power supply 3000 is the charging connection node.

Figure 15:
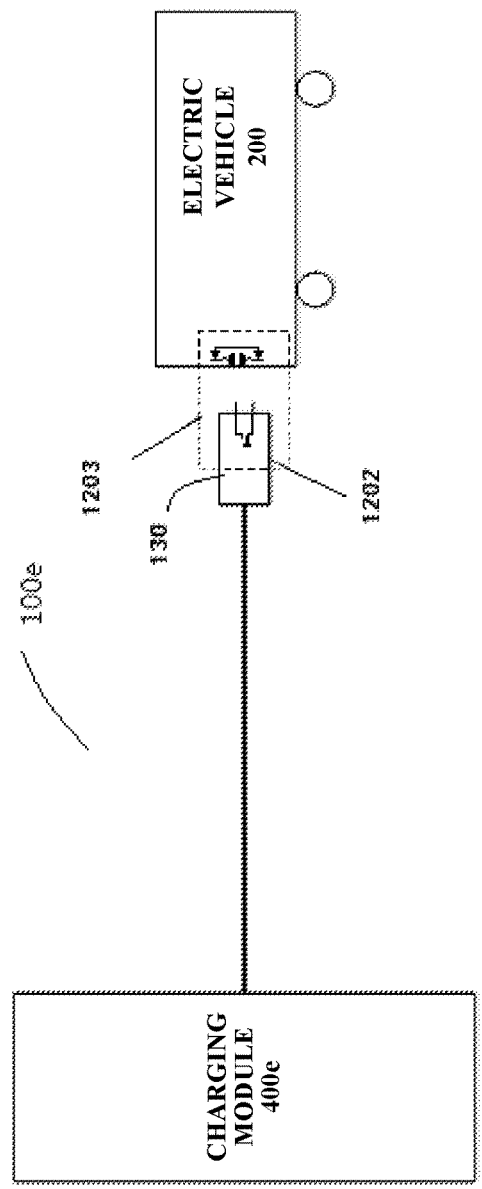
FIG. 15 is a diagram illustrating connections between a high-power DC charger and the power supply, and between the high-power DC charger and the electric vehicle.

Referring to FIG. 15, FIG. 15 is a diagram illustrating connections between a high-power DC charger and the power supply and between the high-power DC charger and the electric vehicle. A high-power DC charger 100e is used as the charging device, the charging module of the high power DC charger is 400e, and the power supply of the high power DC charger 100e is not illustrated in FIG. 15. The high-power DC charger 100e outputs a DC current. The internal structure of the high-power DC chargert100e and connections between the high-power DC chargert100e and the power supply and between the high-power DC chargert100e and the electric vehicle 200 are the same as that in the first embodiment, and the details are not described here. Connection 1203 between the charging gun 1202 and the socket of the electric vehicle 200 is the charging connection node.

In the corresponding embodiments of FIGS. 11-15, when the current temperature $T_c$ of the charging connection node is between the target temperature threshold $T_{ref}$ and the over-temperature threshold $T_p$, the current regulation amount is generated according to a temperature difference between the target temperature threshold $T_{ref}$ and the current temperature $T_c$.

When the charging device charges, and the current temperature of the connector exceeds the target temperature threshold, the temperature of the charging connection node can be regulated to be close to the target temperature threshold. Meanwhile, if the current temperature of the charging connection node exceeds the over-temperature threshold, the charger stops outputting. The electric vehicle is quickly charged while ensuring safe charging. The controlling method and the charging device proposed in this disclosure are planned to be applied to the charger, and also can be promoted to the communication power products.

Although this case has been disclosed by the above embodiments, the disclosure is not limited thereto. Any skilled in the art should make various changes and modifications without departing from spirit and scope of the disclosure, so the protection scope of the disclosure should be determined by the scope of the appended patent application.

What is claimed is:

1. A method for controlling a charging current of an electric vehicle adapted to control temperature of a charging connection node at where a charging connector of a charging device is connected to a power supply or electric vehicle, comprising:

step S1, sampling current temperature ($T_c$) of the charging connection node;

step S2, generating a current regulation amount ($\Delta I$) according to the current temperature ($T_c$) and a preset target temperature threshold ($T_{ref}$); and step S3, regulating the charging current flowing through the charging connection node according to the current regulation amount ($\Delta I$), such that the temperature of the charging connection node is maintained to be close to the target temperature threshold ($T_{ref}$), wherein the step S2 further comprises: when the current temperature ($T_c$) of the charging connection node is between the target temperature threshold ($T_{ref}$) and an over-temperature threshold ($T_p$), generating the current regulation amount ($\Delta I$) that satisfies following Equation:

$$\Delta I = I_o - I_a = K^*(T_c - T_{ref}),$$

wherein $I_a$ is the charging current corresponding to the current temperature, $I_o$ is the maximum charging current, and K is a regulation coefficient.

2. The method according to claim 1, wherein the step S2 further comprises: stopping charging the electric vehicle when the current temperature ($T_c$) of the charging connection node is higher than the over-temperature threshold ($T_p$).

3. The method according to claim 1, further comprising a step S4 between the step S1 and the step S2:
cooling the charging connection node.

4. The method according to claim 3, wherein the charging connection node is cooled by liquid cooling manner.

5. The method according to claim 4, wherein the liquid cooling manner is to control the temperature of the charging connection node by regulating a refrigerating control amount.

6. The method according to claim 5, wherein the refrigerating control amount is regulated to maximum.

7. The method according to claim 3, wherein the charging connection node is cooled by air cooling manner.

8. The method according to claim 7, wherein the air cooling manner is to control the current temperature of the charging connection node by regulating a fan speed.

9. The method according to claim 8, wherein the fan speed is regulated to maximum.

10. The method according to claim 1, further comprising a step S5 before the step S1:
cooling the charging connection node.

11. The method according to claim 10, wherein the charging connection node is cooled by liquid cooling manner.

12. The method according to claim 11, wherein the liquid cooling manner is to control the temperature of the charging connection node by regulating a refrigerating control amount.

13. The method according to claim 12, wherein the refrigerating control amount is regulated to maximum.

14. The method according to claim 10, wherein the charging connection node is cooled by air cooling manner.

15. The method according to claim 14, wherein the air cooling manner is to control the current temperature of the charging connection node by regulating a fan speed.

16. The method according to claim 15, wherein the fan speed is regulated to maximum.

17. The method according to claim 1, wherein close to the target temperature threshold ($T_{ref}$) refers to a temperature fluctuating within +/−3° C. from the target temperature threshold ($T_{ref}$).

18. A charging device of an electric vehicle, comprising: a charging connector connected to a power supply or electric vehicle, and further comprising:
a power converting unit for receiving power supplied by the power supply and supplying a charging current to the electric vehicle;
a temperature detecting unit coupled to the charging connector for sampling current temperature of a charging connection node where the charging connector is connected to the power supply or the electric vehicle; and
a charging control unit coupled to the charging connector and the temperature detecting unit, and being configured to receive current temperature ($T_c$) from the temperature detecting unit, and generate a current regulation amount ($\Delta I$) according to a preset target temperature threshold ($T_{ref}$) and the current temperature ($T_c$) the power converting unit being configured to regulate the charging current flowing through the charging connection node according to the current regulation amount ($\Delta I$), such that the temperature of the charging connection node is maintained to be close to the target temperature threshold ($T_{ref}$),
wherein the charging control unit is further configured to, when the current temperature ($T_c$) of the charging connection node is between the target temperature threshold ($T_{ref}$) and an over-temperature threshold ($T_p$), generate the current regulation amount ($\Delta I$) that satisfies following Equation:

$$\Delta I = I_o - I_a = K^*(T_c - T_{ref}),$$

wherein $I_a$ is the charging current corresponding to the current temperature, $I_o$ is the maximum charging current, and K is a regulation coefficient.

19. The charging device according to claim 18, further comprising a cooling device for cooling the charging connection node.

20. The charging device according to claim 19, wherein the cooling device performs liquid cooling or air cooling.

21. The charging device according to claim 18, wherein close to the target temperature threshold ($T_{ref}$) refers to a temperature fluctuating within +/−3° C. from the target temperature threshold ($T_{ref}$).

22. The charging device according to claim 18, wherein the charging device is an AC charger.

23. The charging device according to claim 18, wherein the charging device is a DC charger.

* * * * *